United States Patent [19]

Schiffbauer

[11] Patent Number: 4,567,763
[45] Date of Patent: Feb. 4, 1986

[54] PASSIVE ENCODER FOR RANGE KNOBS

[75] Inventor: William H. Schiffbauer, Connellsville, Pa.

[73] Assignee: The United States of America as represented by the United States Secretary of Interior, Washington, D.C.

[21] Appl. No.: 536,088

[22] Filed: Sep. 27, 1983

[51] Int. Cl.⁴ .............................................. G01D 3/10
[52] U.S. Cl. .................................. 73/432 A; 324/115; 335/206; 340/688; 200/56 R
[58] Field of Search ............. 73/432 A; 340/688, 686; 324/115; 200/56 R, 61.58 R; 335/206

[56] References Cited

U.S. PATENT DOCUMENTS

| | | | |
|---|---|---|---|
| 2,166,610 | 7/1939 | Reichel et al. | 340/688 X |
| 3,151,226 | 9/1964 | Jones et al. | 335/206 |
| 3,356,944 | 12/1967 | Coon | 324/115 X |
| 3,451,020 | 6/1969 | Downs | 335/206 |
| 3,593,134 | 7/1971 | Seliber | 324/115 |
| 3,689,835 | 9/1972 | Bickford | 324/115 |
| 3,735,300 | 5/1973 | Benner et al. | 335/206 |
| 3,859,651 | 1/1975 | Thomes, Jr. | 335/206 X |
| 4,390,861 | 6/1983 | Cohen et al. | 340/705 X |

FOREIGN PATENT DOCUMENTS

| | | | |
|---|---|---|---|
| 2115815 | 10/1972 | Fed. Rep. of Germany | 324/115 |
| 2800724 | 7/1978 | Fed. Rep. of Germany | 340/686 |
| 2351415 | 12/1976 | France | 324/115 |
| 582534 | 11/1977 | U.S.S.R. | 335/206 |

OTHER PUBLICATIONS

"Autoranger for DFM"; *Elektor*, Oct. 1976, pp. 1018-1021, vol. 2, No. 10; R. Decker.
Bureau of Mines Information Circular 8939; "Passive Encoder for Range Knobs"; Aug. 1983; William H. Schiffbauer; 8 pages.

*Primary Examiner*—Stewart J. Levy
*Attorney, Agent, or Firm*—Thomas Zack; E. Philip Koltos

[57] ABSTRACT

An encoding apparatus provides range or other data as determined by the setting of a control or selection knob therefor. The encoding apparatus is intended for use with an instrument providing an output voltage representative of data within a range, and providing output signals indicative of the setting for the range control or selection switch of the instrument. The encoding device is adapted to fit externally of the instrument chassis and is mounted between the range selecting knob and the chassis. The encoding apparatus is non-invasive, requiring no connection to or modification of the internal components of the measuring instrument.

11 Claims, 6 Drawing Figures

PASSIVE ENCODER FOR RANGE KNOBS

BACKGROUND OF THE INVENTION

This invention relates to apparatus for transmission of data from one instrument to another, and more specifically, to apparatus for transmission of knob setting data, such as range data, between electronic instruments.

In the prior art there are known measuring instruments which generate an analog voltage representative of the quantity being measured. However, in a number of such measuring instruments, measurement data may be provided over a number of ranges for the quantity being measured. One such device is a gas analyzer which provides but a single analog output for eight ranges of gas concentrations. That is, a variable voltage representing the measurement is provided but no indication is given as to the range in which the measurement was made.

In this type of gas analyzer, the output voltage which may be provided to indicate the measured quantity ranges from 0 to 5 volts DC, irrespective of the range of measurement. Thus, where the eight concentration ranges may cover (in parts per million) 0-5, 0-10, 0-20, 0-50, 0-100, 0-200, 0-500, and 0-1000, the provision of a specific output voltage alone is insufficient to identify the actual concentration measured by the analyzer since the same voltage may correspond to eight different measurements.

There is accordingly a need in the prior art to provide range information, corresponding to setting of a range selection knob for example, associated with data provided by an instrument.

There is a more generally expressed need in the prior art to provide information from one instrument to another indicative of a knob setting on the first instrument.

Although such needs may be satisfied by manual input of the range data (or knob setting position) to the receiving instrument, where the latter happens to be a computer, for example, such an approach leads to an increased potential for error, since an operator of the first instrument may forget to input a next range setting upon repositioning the control knob on the panel of the measuring instrument.

In order to provide an automatic transfer of range data from the measuring instrument to a computer, or other instrument, it is also possible to open the chassis of the measuring instrument in order to access the control switch for the range (or other knob) setting. However, this approach is complex, requires major modifications of the internal circuitry of the instrument, and may be physically difficult in the case of an instrument already cramped with electrical and mechanical connections.

There is thus a need for a simple, non-invasive structure for obtaining range data (or other knob setting data) in one instrument and for providing that data to another instrument.

OBJECTS AND SUMMARY OF THE INVENTION

It is accordingly an object of the present invention to provide a simple, non-invasive apparatus for obtaining knob positioning data for an instrument and for providing a signal representative of that data for use by another apparatus.

It is a more specific object of the invention to provide apparatus for determining the range setting for a measuring instrument and to provide data representative of that setting to another apparatus for use in conjunction with measurement data provided by the instrument.

Yet another object of the invention is the provision of structure external to a chassis for conversion of knob positioning information to data for transmission to another device, as well as for provision of a display indicative of the positioning information transmitted to the other device.

It is an additional object of the invention to provide a magnetically operable device for sensing positioning of a knob mounted externally to a chassis, the device being associated with the knob and similarly located externally to the chassis.

To achieve the foregoing and other objects, and in accordance with the purpose of the present invention as embodied and broadly described herein, there is provided an encoding apparatus for a device which has a chassis and a manually set knob external to the chassis and having a plurality of predetermined operating positions. The inventive encoding apparatus includes a sensing means, external to the chassis and associated with the knob for sensing its operating position, an encoding means for encoding the sensed operating position, and an output means for outputting an encoded signal representing the sensed knob position.

In accordance with another feature of the invention, there is provided a magnet associated with the knob and a plurality of reed switches located at the various operating positions of the knob, for sensing the appropriate positioning of the knob. Preferably, each of the reed switches is connected between two voltage levels so that upon closure or opening thereof a voltage change is detected at one of the terminals thereof. Additionally, optical display devices, such as light emitting diodes, may be connected in series with the reed switches so as to be operated in response to the changes in operating status of the switches, thereby to provide visibly perceptible indications of the open or closed status of the reed switches.

The foregoing and other objects, features and advantages of the present invention will become more readily apparent to those skilled in the art from the following description wherein there is shown a preferred embodiment of the best mode for carrying out the invention, simply by way of illustration and not of limitation of the invention.

BRIEF DESCRIPTION OF THE DRAWINGS

The preferred embodiment of the invention will be understood from the following description when taken in conjunction with the accompanying drawings, wherein.

DESCRIPTION OF THE PREFERRED EMBODIMENT

Figure 1:
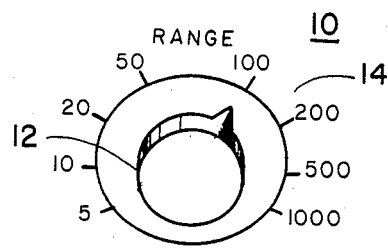
FIG. 1 illustrates a knob having a plurality of predetermined positions for an apparatus.

Referring now to the prior art structure of FIG. 1, there is shown a range position knob assembly 10 as provided on many analyzing instruments. Knob assembly 10 comprises a knob 12 and a range dial 14. Such a range knob is provided on a gas analyzing instrument, for example, wherein an analog DC voltage is provided as an output ranging from zero to five volts DC to represent gas concentration in parts per million for eight different ranges.

While other devices are available for converting the analog voltage to a digital value, the converted digital value is meaningless unless the range information is similarly conveyed.

Because of mechanical and electrical complexity of construction within the instrument chassis, the present invention provides for replacement of the knob assembly 10 by an equivalent, manually operable, structure which both sets the range of operation and automatically provides output signals indicative of the selected range.

In accordance with one aspect of the present invention, there is provided a thin electronic circuit between the knob 12 and the instrument chassis, for encoding and outputting signals representative of the specific range setting for operation.

It is to be understood that, although the circuit disclosed herein is magnetically operable, similar electronic circuits, optical circuits or the like, or mechanically actuated devices may be utilized without departing from the scope of the invention. Referring specifically to the preferred embodiment of FIG. 2, there is shown a printed circuit board 16, upon which are mounted a number of switches 18 and indicators 20. As is apparent from the figure, each switch has two terminals and is series connected with an indicator. Thus, switch $18_1$ is series connected with indicator $20_1$, ... and switch $18_9$ is series connected with indicator $20_9$.

As is further apparent from the figure, each of the switches $18_1$–$18_9$ has one terminal connected to a common terminal connector 22, providing thereto a first voltage level. The second terminal for each of switches $18_1$–$18_9$, in addition to the connection to the associated indicator $20_1$–$20_9$, is connected to a specified one of a plurality of pins on a card edge connector 24. Finally, each of the indicators $20_1$–$20_9$ is provided with a pair of terminals, one of which is connected to the appropriate switch and the other being connected to a common terminal 26. The common terminal 26 is connected to a second voltage level through a current limiting resistor 28. The entire assembly is mounted about a center shaft 30 for the knob 12.

Operation of the inventive structure relies on each one of the sensing switches $18_1$–$18_9$ detecting a specific positioning condition of the range setting knob. Where such detection occurs in the form of switch closure, it is seen that such closure provides the first voltage, connected to the common terminal connector 22, through the switch to the associated indicator, thereby completing a circuit between the first and second voltages through the appropriate indicators. As previously indicated, sensing switches $18_1$–$18_9$ may be mechanically activated devices, or may be electrically, magnetically or optically activated devices. As is apparent from FIG. 2, upon closure of any one of the switches the first voltage of the common terminal connector 22 will be connected to the opposing terminal of the switch, each such terminal being connected by an appropriate lead to an individual pin on the card edge connector 24.

Thus, by detecting the voltage level on the various pins of card edge connector 24, it is possible to determine the positioning of the knob 12 mounted on shaft 30. However, it is also recognized that the specific sensing switches shown in the figure need not all be identical. Thus, while some switches may close upon rotation of the knob thereover, other switches may open. Further, some switches may close or open momentarily while others may close or open permanently. Thus, the output voltages provided at the pins of card edge connector 24 may encode the position of the knob in many different ways.

For the illustrative description shown herein, it is assumed that each of the swtiches $18_1$–$18_9$ is associated with a specific range setting position of knob 12. Further, it is assumed that each of the switches closes only when the knob is positioned to the range selecting orientation associated therewith. Thus, in the preferred embodiment, for each position of the range knob only one of the connecting pins 1–5 and 7–10 of card edge connector 24 will have a voltage thereon in common with the voltage on pin 6, the latter connected to common terminal connector 22.

Preferably, the indicators $20_1$–$20_9$ are light emitting diodes (LED) which light upon application of a voltage thereto. Further, in order advantageously to provide the desired degree of miniaturization, and the associated thin physical dimensions for the inventive structure to fit between the instrument chassis and the knob, switches $18_1$–$18_9$ are selected as magnetic reed switches. Such switches are available as small glass capsules which are one half inch long and one eighth inch in diameter. As is known in the art, each such capsule houses two metal contacts which may be forced together (or apart) in the presence of a magnetic field.

Figure 3:
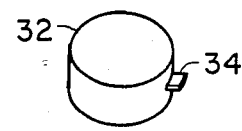
FIG. 3 illustrates a modified form of a knob for use in conjunction with the structure of FIG. 2 in accordance with the invention.
Figure 2:
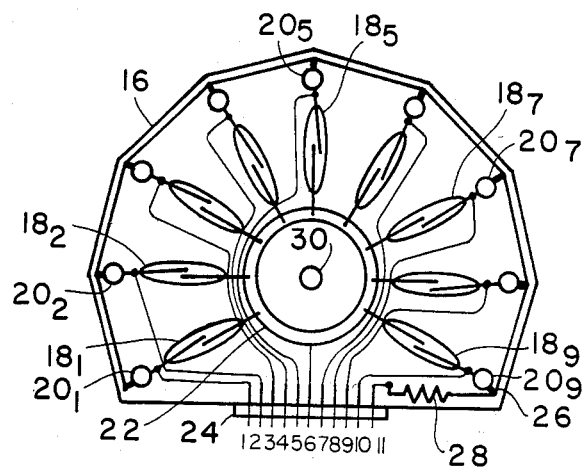
FIG. 2 shows an apparatus in accordance with the present invention for encoding the positions of the knob in FIG. 1.

In order to activate the switches shown in FIG. 2, the knob 12 of FIG. 1 is modified a shown in FIG. 3. Specifically, a small magnet 34 (for example, with dimensions of one half inch by one sixteenth inch by one quarter inch) may be inserted in a hole formed in the knob 32. Alternatively, a magnetic material may be bonded to the bottom surface of the knob or may be otherwise attached thereto for activation of the switches. Thus, when the structure of FIG. 2 is mounted on shaft 30 adjacent the instrument chassis, and when knob 32 is appropriately oriented and mounted on shaft 30, rotation of the knob in order to rotate the shaft 30 for setting the particular operating range results both in provision of a visual range indication by activation of a specified LED and in generation of specified encoded signals representing the particular range setting.

Preferably, the circuit board is sufficiently thin (one sixteenth inch, for example) so that, together with the LED's and reed switches the structure, when mounted adjacent the chassis, permits knob 32 to be mounted on shaft 30. Of course, where such is not the case, an extender may be provided for shaft 30 to permit knob 32 to be appropriately mounted.

Figure 4:
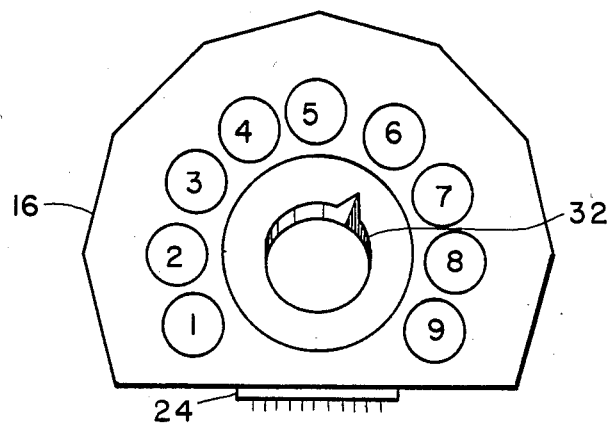
FIG. 4 shows a perspective view of the combination of structures shown in FIGS. 2 and 3 as applied to replace the structure of FIG. 1.
Figure 5:
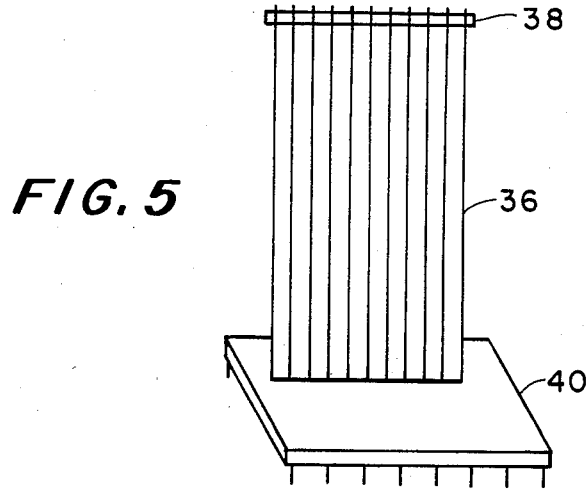
FIG. 5 shows a connection cable for use with the structure of FIG. 2.

Referring now to FIG. 4, there is shown a combination of the structures of FIGS. 2 and 3. The circuit board 16 is encapsulated in a clear plastic for protection and is mounted to the instrument chassis. The circuit board may be attached by bonding, by the use of mechanical fasteners, or by the use of double sided adhesive tape, for example, Inasmuch as circuit board 16 now covers range dial 14, and since the visual indicators associated with the inventive structure do not provide specific readouts in terms of the particular ranges selected for operation, it is preferred that a list of the ranges associated with the particular positions be kept and, if possible, mounted to the chassis on a separate label adjacent the range knob.

The purpose of the structure hereinabove described is to provide electrical output signals indicative of a range setting for a particular knob. In order to function properly, there are required two voltage levels for connection to the pins on the card edge connector 24. While such voltage levels may be obtained by connection to internal sources within the instrument, or alternatively may be obtained from the receiving instrument by connection to pins 6 and 11 of the card edge connector, preferably the interconnection between the measuring instrument having the range knob and the instrument receiving the range knob is independent of such voltages. Towards that end, the preferred embodiment provides a specified output circuitry from which the range data signals may be taken. A ribbon cable 36 is provided with a mating connector 38 for card edge 24. The ribbon cable 36 is connected to a dual inline package (DIP) connector 40 which may, for example, be a sixteen pin connector.

Figure 6:
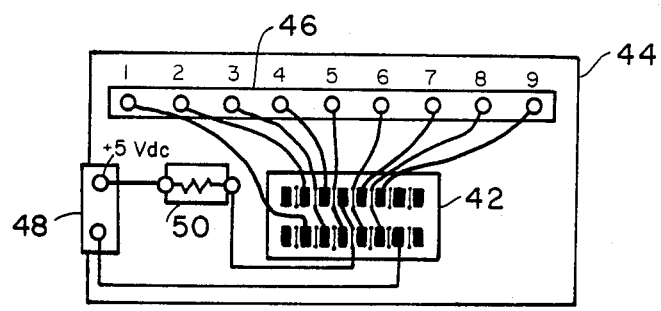
FIG. 6 shows an interface board for connection to the cable shown in FIG. 5 to provide output signals representative of the setting of the structure in FIG. 4.

A corresponding DIP connector 42 is provided on an interface board 44 shown in FIG. 6. Obviously such a board could be used with a digital computer. A pair of terminal strips 46 and 48 is provided on the interface board 44 for connection to the range data lines of ribbon cable 36 and to the voltage supply lines thereof, respectively. Thus, nine terminals on strip 46 are connected to the nine range data connectors of DIP connector 42. Preferably, the system encodes the settings of switches $20_1 \ldots 20_9$ by appropriately connecting the various switches to particular conductors of cable 36 and by particular connections to the pins of connector 40 so that terminal 1 of strip 46 is connected to the output of switch $18_1$, terminal 2 of the strip is connected to the output of switch $18_2$, ... and terminal 9 is connected to the output of switch $18_9$ of circuit board 16. Of course, other arrangements may similarly be provided. The two terminals provided on terminal strip 48 are connected to the two supply voltage connectors of DIP connector 42 and thus to pins 6 and 11 of card edge connector 24. For example, +5 volts DC may be provided through a second current limiting resistor 50 mounted to interface printed circuit board 44, while −5 volts DC or ground may be provided through a second terminal on terminal strip 48. It is recognized that either single polarity or dual polarity supply voltages may be provided via terminal strip 48 to the structure shown in FIG. 2, with the mere requirement of a modification of terminal strip 48 to include two or three terminals.

There has thus been described an apparatus for providing range (or other) data from a knob setting on one instrument to a further instrument for utilization therein. The inventive structure is independent of a requirement for invasion of the instrument chassis and thus provides a straightforward and simple solution to the problem of obtaining range data.

The foregoing description of a preferred embodiment of the invention has been presented for purposes of illustration and description, and is not intended to be exhaustive or to limit the invention to the precise form disclosed. The embodiments were chosen and described in order best to explain the principles of the invention and its practical application, thereby to enable others skilled in the art best to utilize the invention in various embodiments and with various modifications as are suited to the particular use contemplated. It is to be understood that the invention is not limited to the exact details of construction shown and described, for obvious modifications can be made by a person skilled in this art.

I claim:

1. A portable encoding apparatus useable with a digital computer, said apparatus being for a device including a chassis and a manually set knob external to said chassis having a plurality of different predetermined operating positions representing different scalar readings, said apparatus also being located entirely external to and non-invasive of said chassis, comprising:
   sensing means external to said chassis and cooperating with said knob for sensing an operating position of said knob for a specific scalar reading;
   encoding means for encoding the sensed position of said knob;
   output means for outputting an encoded signal representative of the sensed operating position of said knob, said encoded signal being in digital format; and
   a digitally operated computer for receiving and processing said outputted encoded signal.

2. An encoding apparatus as claimed in claim 1, further comprising display means connected to said sensing means for displaying the position of said knob as sensed by said sensing means.

3. An encoding apparatus as claimed to claim 1, wherein said sensing means comprises electromagnetic means for electromagnetically sensing the operating position of said knob.

4. An encoding apparatus as claimed in claim 3, wherein said electromagnetic means comprises electromagnetic field generating means associated with said knob and a plurality of electromagnetic field sensing means at positions corresponding to said plurality of operating positions of said knob for sensing positioning of said knob at one of said plurality of operating positions and for generating individual signals representative thereof.

5. An encoding apparatus as claimed in claim 4, wherein said plurality of electromagnetic field sensing means comprises electromagnetically actuated switch means responsive to the position of said electromagnetic field generating means.

6. An encoding apparatus as claimed in claim 5, wherein said electromagnetic field generating means comprises a magnet and said plurality of electromagnetic field sensing means comprises a plurality of reed switch means responsive to said magnet.

7. An encoding apparatus as claimed in claim 6, further comprising display means for displaying the knob position sensed by said plurality of reed switch means.

8. An encoding apparatus as claimed in claim 7, wherein said display means comprises optical signal generating means responsive to closure of individual ones of said reed switch means for generating optical display signals indicative of the individual reed switch whose closure has been detected.

9. An encoding apparatus as claimed in claim 8, wherein said reed switch means each have two terminals, and are connected at one terminal to a first voltage level and at another terminal to a different voltage level to permit closure and opening thereof to be detected at one of said terminals by detection of a voltage change thereat, and wherein said optical signal generating means comprises a plurality of light emitting diodes, individual ones of which are series connected with individual ones of said reed switch means, thereby to provide a visibly perceptible change in operating status of said light emitting diodes responsive to closure and opening of the reed switch connected thereto.

10. An encoding apparatus as claimed in claim 4, wherein said encoding means comprises means for forming a specific electrical signal from the individual signals generated by said electromagnetic sensing means to represent a specific one of the operating positions of said knob.

11. An encoding apparatus as claimed in claim 10, wherein said encoding means comprises means for connecting individual ones of said electromagnetic sensing means to specific output terminals, thereby to provide signals at the specific output terminals representative of specific positions of said knob.

* * * * *